UNITED STATES PATENT OFFICE.

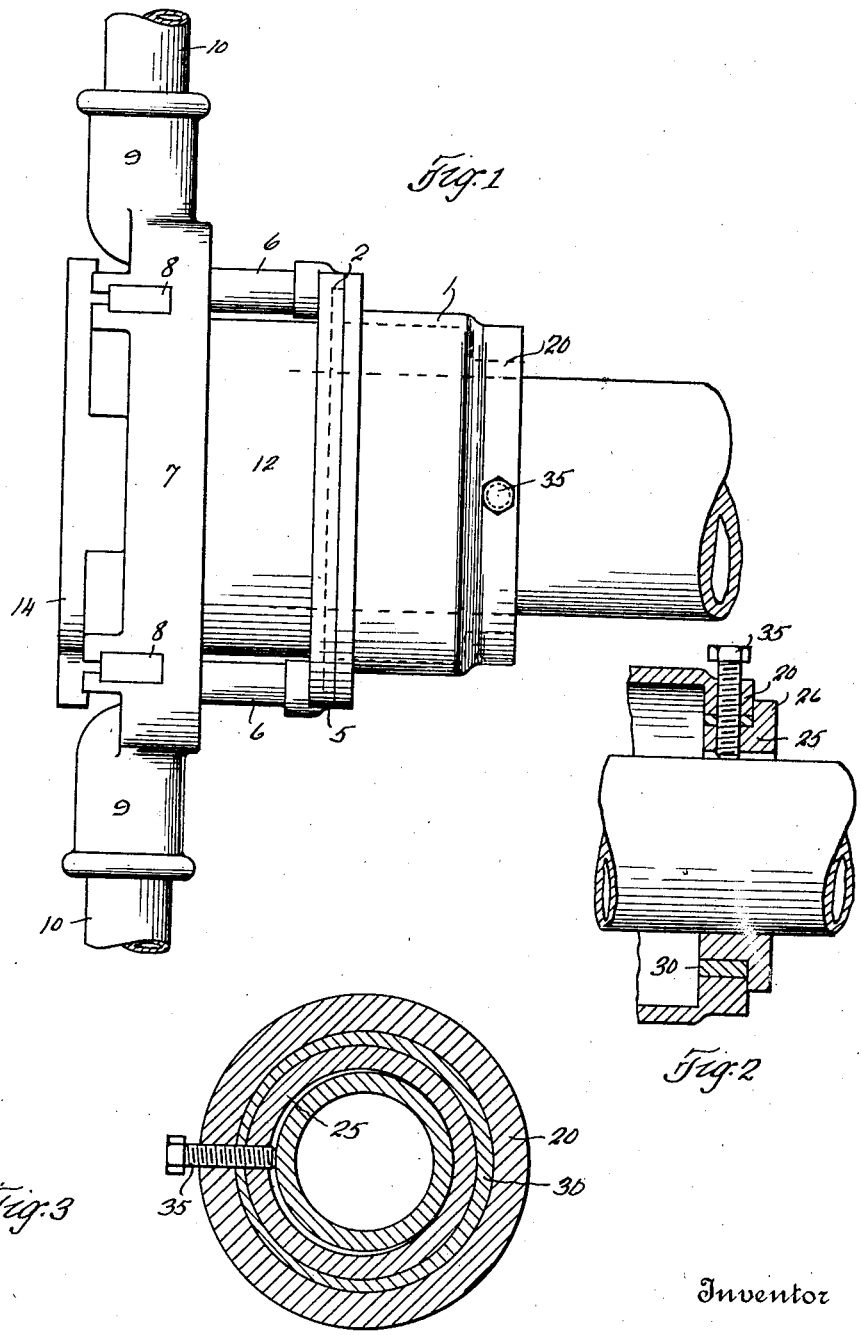

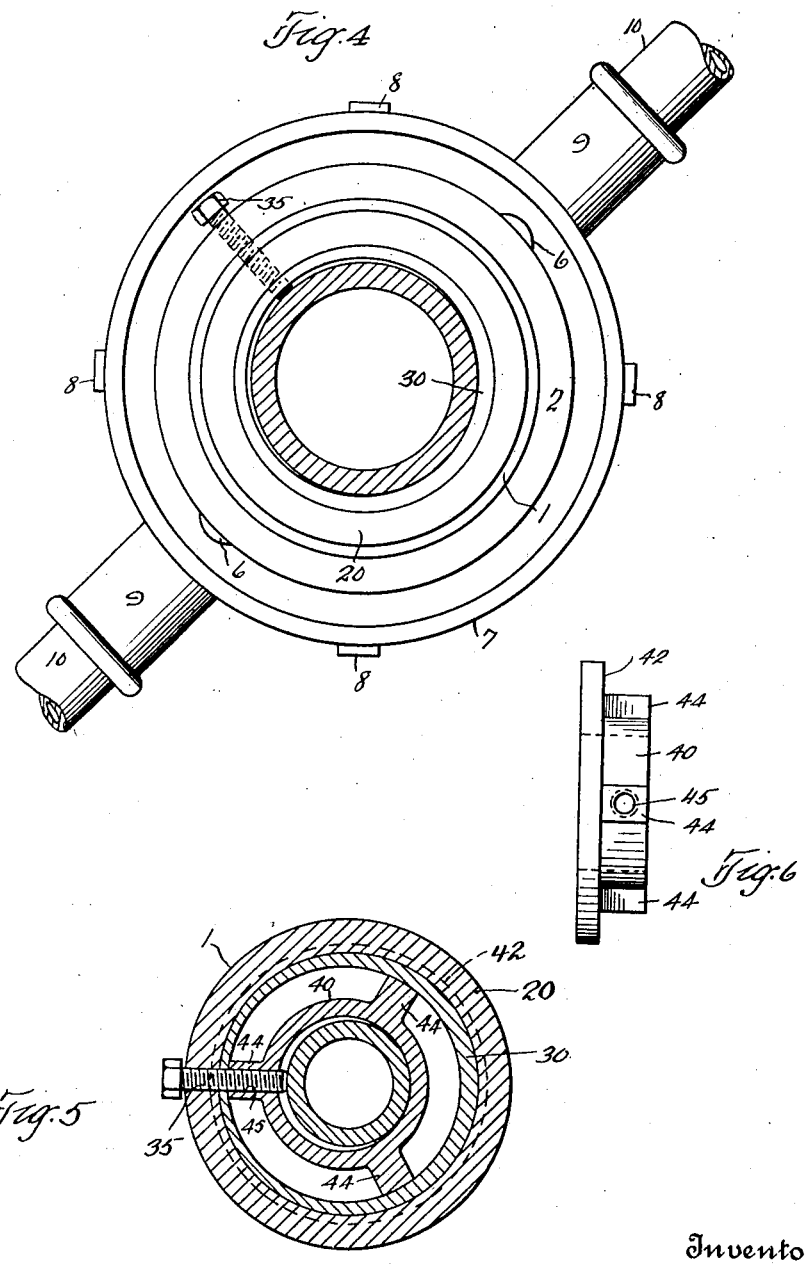

IRA W. NONNEMAN, OF WARREN, OHIO, ASSIGNOR TO THE BORDEN COMPANY, OF WARREN, OHIO, A CORPORATION OF OHIO.

CENTERING DEVICE FOR PIPE-WORKING TOOLS.

1,355,248.  Specification of Letters Patent.  Patented Oct. 12, 1920.

Application filed April 30, 1919. Serial No. 293,632.

*To all whom it may concern:*

Be it known that I, IRA W. NONNEMAN, a citizen of the United States, residing at Warren, in the county of Trumbull and State of Ohio, have invented a certain new and useful Improvement in Centering Devices for Pipe-Working Tools, of which the following is a full, clear, and exact description, reference being had to the accompanying drawings.

This invention relates to centering devices for pipe working tools, such as pipe cutters, die stocks and similar devices, wherein it is desired to provide a guide frame or collar adapted to be rigidly secured to the pipe and to which the pipe cutter or die stock is rotatably attached. Such guide collars are usually adapted to receive bushings for various sizes of pipe and both bushings and the collar have an inner surface fitting over the pipe which, by common practice, is made slightly larger than the pipe. Making the opening in the bushings or guide collar larger than the diameter of the pipe which it is to embrace is necessary, due to irregularities in the pipe, and to allow passing freely over the bur usually formed at the end of the pipe when it is cut. The result is that in tightening the guide collar to the pipe, it is customary to use three or more screws and care must be exercised in the tightening of these screws to prevent throwing the guide collar off center, or out of alinement with the pipe itself. The essential object of the invention is to avoid these difficulties and to simplify the tightening of the guide collar onto the pipe. A more specific object is to accomplish this purpose by the use of only one tightening member, as for example, a single set screw. The method of accomplishing the above and other objects is made clear in the following specification which relates to the drawings, illustrating a preferred embodiment thereof. The essential characteristics are summarized in the claims.

In the drawings, Figure 1 is a side elevation of a die stock fitted to a guide collar, embodying my invention; Fig. 2 is an axial section through the guide collar shown tightened into position by a single set screw; Fig. 3 is a transverse section of the same taken substantially on a plane extending through the set screw; Fig. 4 is a rear elevation of the die stock and guide collar showing a pipe extending therethrough; Fig. 5 is a transverse section through the guide collar showing a modified form of bushing; Fig. 6 is a side elevation of this modified bushing removed.

In the drawings, I have shown, for convenience of illustration, a die stock carried by the guide collar forming the subject matter of this application, and the particular die stock shown forms the subject matter of a separate application filed by me on an even date therewith and numbered Serial No. 293,633, in which application this die stock is more fully shown, described and claimed.

Referring to the drawings by the use of numerals, my guide collar comprises substantially a cylindrical body 1 having at its forward end an outwardly extending flange 2 shown as rotatably embraced by a ring 5, which rigidly carries pins 6 extending forwardly therefrom and closely embraced by a chaser carrying frame 7, in which are radially movable chasers 8. Extending outwardly from the frame 7 are bosses 9 internally threaded for receiving the die stock handles 10. The frame 7 is rigid with a cylindrical member 12 fitting the cylindrical inner surface of the body 1, and the chasers 8 are radially positioned and caused to recede, to give the threads a taper, by a suitable tapered bushing which is provided with a flange 14. Reference may be had to the application above referred to for a detailed description of this die stock.

The guide collar 1, as stated, is preferably cylindrical and the interior rotatably and slidably embraces the ring of the chaser carrying frame, or like part of any pipe working tool as desired. The end of the collar opposite the flange 2 is provided with an inwardly extending integral rib or flange 20 concentric with the body of the collar and the flange 2, and having its inner surface cylindrically bored.

In ordinary use a pipe is embraced by a bushing 25 having a cylindrical bore and a cylindrical surface concentric therewith, while a flange 26 extends outwardly and abuts the face of the rib 20. I desire to use the usual bushings 25 which for convenience have their inner and outer surfaces concentric. To do this and accomplish the objects of the present invention, I employ a bushing in the nature of a liner indicated at 30 which has a cylindrical exterior closely fitting the bore of the rib 20. The liner 30 has its inner cylindrical surface eccentric with relation to the exterior. The amount of this eccentricity is determined by the amount of clearance which the inner bore of the bushing 25 has over the exterior of the pipe. That is, it is common practice to make the guide bushings for such tools approximately a sixteenth of an inch, or slightly more, larger in diameter than the standard exterior dimension of the pipe on which it is desired to operate. This provides a clearance for rendering it easy to move the bushing over the pipe without the necessity of removing the usual bur at the end of the pipe, and without encountering obstructions such as the irregularities on the surface of the pipe.

To clamp such a bushing rigidly on the pipe by the use of hand operated clamping means such as set screws, care must be exercised not to draw the bushing more to one side than another, thus bringing the guide, and consequently the pipe working tool, out of true alinement with the pipe. If a single set screw is used, it must necessarily draw the bushing into contact with the pipe at one side thereof only, throwing the guide off center a distance equivalent to one half the clearance of the bushing. Accordingly I make the bushing liner 30 eccentric an amount equal to one half of the clearance of the guide over the pipe, and at the point of the greater eccentricity I use a single set screw 35 engaging the pipe to bring the guide collar into concentric relation with the pipe.

The set screw 35 preferably extends through the rib 20 as shown, through the thinnest part of a bushing liner 30, and when the bushings 25 are used, they also extend through an opening therein as shown in Fig. 3. It will be noticed that when the collar is clamped onto the pipe, the set screw projects into the opening surrounding the pipe a distance equivalent to twice this eccentricity.

Such a device may be used for various sizes of pipe; the largest size may fit within the liner 30 itself, the inner diameter of the liner being such that it has the proper clearance over the standard exterior diameter of the pipe which it is designed to embrace. Bushings 25 having an exterior closely fitting the liner and an interior to fit the pipe may be graded as to size of inner diameter and readily removed and substituted as desired.

It will be seen that this eccentricity may readily be provided for by making the opening through the rib 20 eccentric, but I prefer to use the liner 30. It has advantages in cheapness of manufacture. A further advantage is that it is sometimes desirable to work on a piece of pipe immediately adjacent a sleeve connection, and as such sleeve connections are larger than the exterior of the pipe this offers difficulties which I overcome by making the liner 30 removable, the opening into which the liner fits being of such a diameter that it may pass over the exterior of a sleeve connection. Accordingly it is only necessary to remove this liner and bring the rib 20 over such a sleeve connection, allowing the pipe working tool to operate as closely to the connection as is desired.

When using this invention on sizes of pipes very much smaller than the diameter of the liner, the bushings between the liner and the pipe may be made much lighter and a saving of metal effected by constructing the bushings as shown in Figs. 5 and 6. Here is shown a substantially cylindrical body 40 integral with an outwardly extending flange 42 adapted to engage the face of the rib 20. Radiating from the body 40 are three or more projections 44 having their exterior partially cylindrical to fit the interior of the liner 30. The set screw 35 may extend through an opening 45 in one of the projections 44 and engage the pipe as shown in Fig. 5, accomplishing the clamping in the same manner as above described. This bushing has the bore of its body concentric with the surfaces of the projections 44 and in eccentric relation to the pipe in the same manner as the bushings 25.

Having thus described my invention, what I claim is:

1. In a device of the character described, the combination with a pipe working tool, of a member carried thereby and adapted to surround a pipe and having an opening for the pipe slightly larger in diameter than the exterior of the pipe and eccentric with relation to the remainder of the member and the axis of the pipe, and clamping means adapted to hold the member rigidly to the pipe by engaging the pipe in such manner so as to draw the member into concentric relation with the pipe.

2. In a device of the character described, the combination with a pipe working tool, of an annular member carried thereby and having an opening for receiving the pipe slightly larger in diameter than the exterior of the pipe, said opening being eccentric with relation to the member, and clamping means carried by the member and adapted to engage the pipe removably at the point of the greatest eccentricity of said opening.

3. In a device of the character described, the combination with a pipe working tool, of an annular member therefor adapted to surround the pipe and having an opening larger than the exterior of the pipe to provide a clearance, said opening being eccentric an amount equivalent to one-half of the clearance, and clamping means carried by the member and adapted to engage the pipe at the point corresponding to the greatest eccentricity of said opening, and force it into engagement with the opposite side of the member and thereby hold it concentric with the axis of the tool.

4. In a device of the character described, the combination of an annular member adapted to surround a pipe, and having an opening eccentric with relation to the annular member, a removable bushing adapted to fit said opening and embrace the exterior of the pipe, said bushing having its inner and outer surfaces concentric, and a screw carried by said annular member and adapted to draw the latter into concentric relation with the pipe.

5. In a device of the character described, the combination of an annular member adapted to surround a pipe, and having an opening eccentric with relation to the annular member, a bushing adapted to fit said opening and embrace the exterior of the pipe, said bushing having its inner and outer surfaces concentric, and a set screw carried by said annular member and adapted to extend through said bushing and engage the pipe and tending to draw the annular member into concentric relation with the pipe.

6. The combination of an annular guide collar for a pipe working tool adapted to surround a pipe and having a concentric opening, a liner for said opening having a cylindrical exterior and a cylindrical interior eccentric with relation to the exterior, the interior diameter of said liner being such that it provides a clearance over the normal exterior of the pipe to be operated upon, said clearance being approximately twice the amount of eccentricity, and clamping means carried by the guide collar and adapted to engage the pipe at the point of the greatest eccentricity.

7. In a device of the character described, the combination of an annular guide collar having an opening for receiving a pipe, a liner having cylindrical interior and exterior surfaces slightly eccentric, a bushing fitting the inner surface having concentric exterior and interior surfaces, a screw adapted to engage the pipe extending through the guide collar, liner and bushing and positioned to bring the pipe into concentric relation with the guide collar.

8. In a device of the character described, the combination of an annular guide collar for a pipe working tool having a cylindrical opening, an eccentric bushing in said opening, a concentric bushing adapted to fit the first mentioned bushing and having its inner diameter slightly larger than the diameter of the pipe to be operated upon, and clamping means carried by the guide collar and adapted to engage the pipe adjacent the point of greatest eccentricity of the first mentioned bushing, both of said bushings being removable.

9. In a device of the character described, the combination of a member for a pipe working tool adapted to surround the pipe and having an opening eccentric with relation to the member an amount equivalent to approximately one-half the normal clearance of the guide bushing, a skeleton guide bushing having an annular body and radial projections adapted to fit said opening, the opening of said skeleton bushing being concentric with the outer surface of said projections.

10. The combination of an annular member for a pipe working tool having a pipe receiving opening, slightly eccentric, a skeleton guide bushing having an annular body portion and an outwardly projecting flange adapted to fit against the annular member and having projections adapted to fit said opening and bring the interior of the bushing into concentric relation therewith, and a screw adapted to extend through the annular member and through one of said projections to engage the pipe within the inner bushing, said screw being positioned to act on the pipe at the point of greatest eccentricity of said opening.

11. In a device of the character described, the combination of a collar having a circular opening eccentric of its axis, and adapted to receive a bushing having concentric inner and outer walls, and a screw adapted to pass through the collar and hold a pipe eccentrically of the bushing and concentric of the axis of the collar.

In testimony whereof, I hereunto affix my signature.

IRA W. NONNEMAN.